Figure 1:
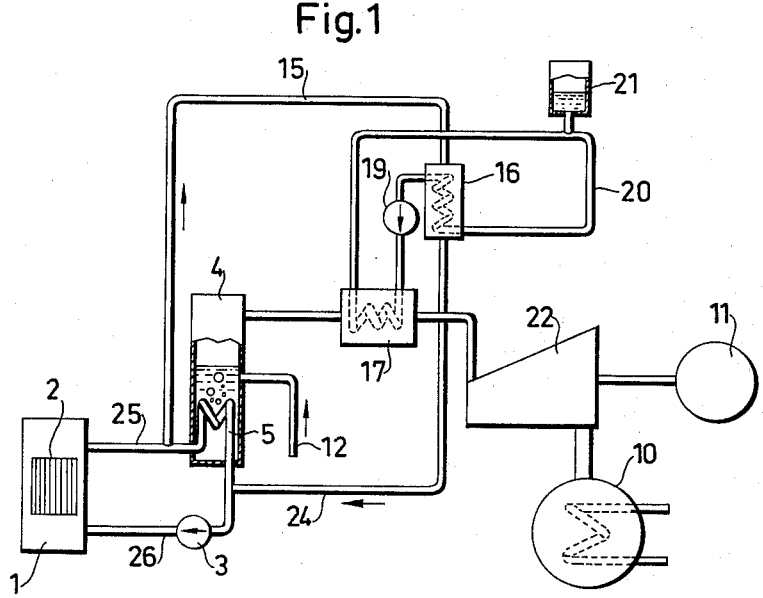

# United States Patent Office 3,197,380
Patented July 27, 1965

3,197,380
POWER PLANT FOR SUPERHEATING THE STEAM ORIGINATING FROM THE STEAM GENERATOR OF A NUCLEAR PRESSURIZED WATER REACTOR
Jöns Arthur Dahlgren, Elsa Borgs Gata 24, Stockholm, Sweden
Filed Jan. 28, 1963, Ser. No. 254,277
Claims priority, application Sweden, Feb. 23, 1962, 2,031/62
4 Claims. (Cl. 176—65)

In a nuclear pressurized water reactor the hot pressurized water from the reactor is usually allowed to give up its heat content in a steam generator consisting of a heat exchanger the low temperature side of which is cooled by water which is heated so as to boil. The steam is usually utilized for driving turbines for electric generators.

It is desired that the steam entering a turbine is superheated to a certain extent, viz. either to the extent that no condensation takes place in the turbine, or in case condensation takes place, to the extent that the water content of the steam is below 12 percent by weight. In a pressurized water reactor the steam can be superheated by a minor part of the hot pressurized water in a heat exchanger serving as superheater. Such a heat exchanger must be big owing to the low heat transfer through a heat exchanging wall having its high temperature side in contact with water and its low temperature side in contact with steam. Additionally, such a heat exchanger must be made with a great accuracy and of a high quality material, owing to the fact that the water at the high temperature side is contaminated by radioactive products formed during the passage through the reactor. The radioactivity must not be transferred to the steam at the low temperature side. Therefore, such a heat exchanger will be expensive.

It is an object of the invention to provide, in combination with a pressurized water nuclear reactor, a heat exchange method making it possible to superheat the steam in a simple and economical way, without any risk of radioactive products being transferred from the reactor to the superheated steam. It is another object of the invention to utilize said method on a power plant so as to superheat the steam not only before it enters into the turbine but also when it is passing from a high pressure element of the turbine to a subsequent low pressure element. Other objects of the invention will be apparent from the following specification.

It has been found, according to this invention, that the devices for superheating the steam can be made less complicated and at a lower cost if a minor portion of the pressurized water is passed through a first heat exchanger, in which it is allowed to heat an auxiliary liquid, and the auxiliary liquid, being thus heated, is passed through a second heat exchanger, in which it is allowed to superheat the steam.

Said first heat exchanger must be made of a high quality material, as its high temperature side is in contact with radioactive water, but it can be comparatively small, as the heat transfer liquid–liquid is good. Said second heat exchanger, the superheater, must be comparatively big, owing to the low heat transfer water–steam, but it can be made of a cheap material, as it has no contact with any radioactive material.

The auxiliary liquid, preferably water, can be circulated in a separate system. It is possible, however, to use feed water as auxiliary liquid. The feed water is heated in said first heat exchanger, is allowed to give up its heat in the superheater, and is thereafter fed into the steam generator.

In a multiple-element turbine it is sometimes desired to arrange an intermediate superheater between two turbine elements. According to the invention the auxiliary liquid, after having been heated in said first heat exchanger and having been allowed to give up its heat in the superheater, can be passed to such an intermediate superheater between two turbine elements. Thereafter it is either again heated in said first heat exchanger, or, in case the auxiliary liquid is feed water, is supplied to the steam generator. The auxiliary liquid can of course in a corresponding way be passed in series through a plurality of intermediate superheaters.

The fluids are preferably passed in counter-current flow through all heat exchangers, in order that the temperature differences shall be utilized to the highest possible degree.

The invention shall be more closely explained with reference to the accompanying drawings which illustrate three embodiments. On the various figures corresponding parts are designated by the same reference characters.

FIG. 1 shows diagrammatically a pressurized water reactor 1 having a core 2 which contains the fissionable material. The hot pressurized water from the reactor is pumped by a circulation pump 3 through a circuit 25, 26 to the heat exchanger 5 of a steam generator. Feed water is supplied through a conduit 12 to the low-temperature side of the steam generator. The feed water is brought to boil, and the produced steam is passed through a superheater 17, a turbine 22 which drives an electric generator 11, and finally to a condenser 10.

A minor portion of the pressurized water is discharged from the reactor through a conduit 15, passes through a heat exchanger 16 and is returned to the reactor through a conduit 24. An auxiliary liquid, preferably water, is passed through the low temperature side of the heat exchanger 16, and is then passed through the high temperature side of the heat exchanger 17 via a conduit 20 which contains a circulation pump 19. Conduit 20 is connected to an expansion vessel 21. Heat exchanger 16 is preferably made of stainless steel, whereas superheater 17 can be made of common steel.

Figure 2:
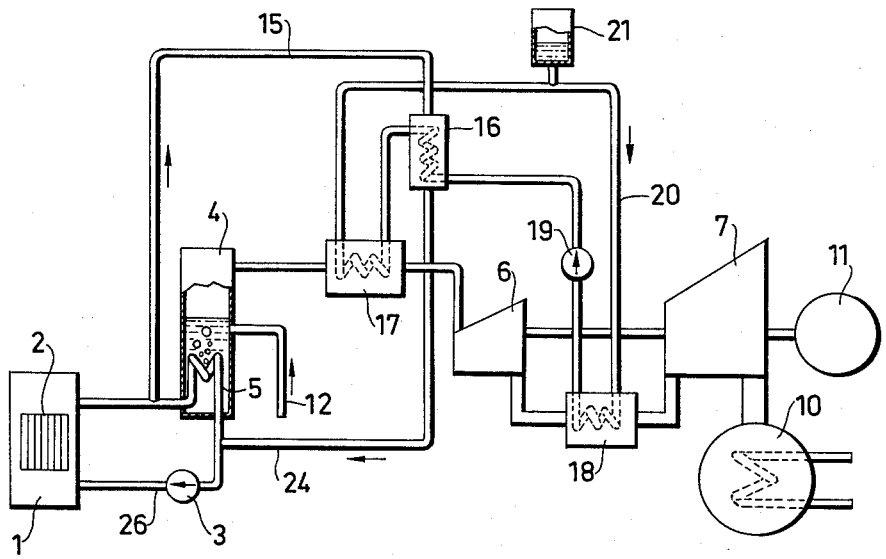

The apparatus of FIG. 2 distinguishes from that of FIG. 1 in that the turbine is a two-element turbine, having a high pressure element 6 and a low pressure element 7. An intermediate superheater 18 for the steam is arranged between said two turbine elements. The auxiliary liquid is pumped through heat exchanger 16, superheater 17 and intermediate superheater 18 and back to heat exchanger 16.

Figure 3:
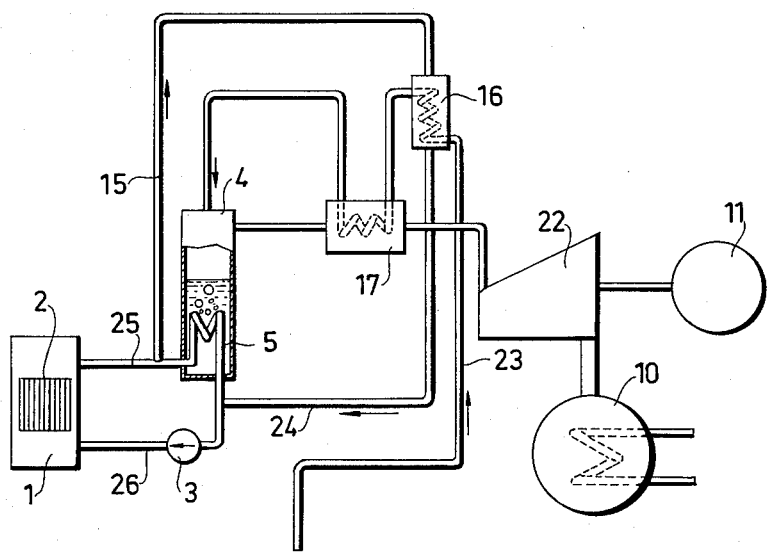

In the device of FIG. 3 the feed water for the steam generator is used as auxiliary liquid. The feed water is supplied through a conduit 23, is passed through heat exchanger 16 and superheater 17, and is added to steam generator 4. This device is less complicated than that of FIG. 1 by the fact that the high pressure installation comprising conduit 20, circulation pump 19 and expansion vessel 21 has been omitted. Additionally, the device of FIG. 3 involves the advantage that the heating of the cold feed water (which is usually supplied from condenser 10) in heat exchanger 16 occurs at a high temperature difference.

According to a preferred modification of the device illustrated in FIG. 3 the feed water is passed through the heat exchanger 16, through the superheater 17, thereafter through an intermediate heat exchanger (corresponding to heat exchanger 18 in FIG. 2) in heat exchange with the steam passing from a high pressure element to a low pressure element of the turbine 22, and is finally passed into the steam generator.

The minor quantity of pressurized water used to heat the auxiliary liquid shall preferably amount to 5–15 percent of the total quantity of pressurized water flowing through the reactor. In the embodiment of FIG. 1 it may be sufficient to pass 5 percent of the total flow of pressurized water through heat exchanger 16, whereas in the embodiments of FIGS. 2 and 3 the corresponding figure is preferably 10–15 percent, or perhaps a little more.

What is claimed is:

1. A nuclear reactor device for the production of superheated steam comprising a nuclear reactor of the pressurized water type, a steam generator, a heat exchanger, a steam superheater, means for passing a major portion of the pressurized water from the reactor through the steam generator in heat exchange with water contained therein, means for recirculating the major portion of the pressurized water from the steam generator to the reactor, means for passing the steam produced in the steam generator through the superheater, means for passing a minor portion of the pressurized water from the reactor through the heat exchanger, means for recirculating the minor portion of the pressurized water from the heat exchanger to the reactor, means for passing an auxiliary liquid through the heat exchanger in heat exchange with the minor portion of the pressurized water, and means for passing the auxiliary liquid from the heat exchanger through the superheater in heat exchange with the steam passing through the superheater.

2. The power plant as defined in claim 1, additionally comprising an intermediate superheater for the steam passing from a high-pressure element to a low-pressure element of the turbine, and means for returning the auxiliary liquid from the steam superheater to the heat exchanger via said intermediate superheater in heat exchange with the steam passing through said intermediate superheater.

3. A power plant comprising a pressurized water nuclear reactor, a steam generator, a heat exchanger, a steam superheater, a steam turbine, means for passing a major portion of the pressurized water from the reactor through the high temperature side of the steam generator, means for recirculating the major portion of the pressurized water from the steam generator to the reactor, means for passing the steam produced in the steam generator through the steam superheater to the steam turbine, means for passing a minor portion of the pressurized water from the reactor through the heat exchanger, means for recirculating the minor portion of the pressurized water from the heat exchanger to the reactor, means for passing feed water through the heat exchanger, in heat exchange with the minor portion of the pressurized water, means for passing the feed water from the heat exchanger through the steam superheater in heat exchange with the steam passing through the superheater, and means for passing the feed water from the steam superheater to the steam generator.

4. The power plant as defined in claim 3, additionally comprising an intermediate superheater for the steam passing from a high pressure element to a low pressure element of the turbine, and means for passing the feed water from the steam superheater to the steam generator via said intermediate superheater in heat exchange with the steam passing through said intermediate superheater.

References Cited by the Examiner

UNITED STATES PATENTS

| 3,047,479 | 7/62 | Young et al. | 176—53 |
| 3,085,056 | 4/63 | Whitelaw | 176—13 |

FOREIGN PATENTS

| 841,920 | 7/60 | Great Britain. |

OTHER REFERENCES

Robbins: "Low-Temperature Steam Power Cycles for Water-Cooled Reactors"; Nucleonics, January 1953, volume 11, No. 1, pages 42 and 43.

Atomics & Nuclear Energy, February 1958, volume 9, No. 2, pages 58–66, "The Dresden Nuclear Power Station."

CARL D. QUARFORTH, *Primary Examiner.*

REUBEN EPSTEIN, *Examiner.*